United States Patent
Jonsson

(10) Patent No.: US 7,555,077 B2
(45) Date of Patent: Jun. 30, 2009

(54) METHOD FOR PATH-SEARCHER SCHEDULING

(75) Inventor: Elias Jonsson, Malmö (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 707 days.

(21) Appl. No.: 10/527,366

(22) PCT Filed: Aug. 23, 2003

(86) PCT No.: PCT/EP03/09371

§ 371 (c)(1),
(2), (4) Date: Jul. 27, 2005

(87) PCT Pub. No.: WO2004/025859

PCT Pub. Date: Mar. 25, 2004

(65) Prior Publication Data

US 2005/0271122 A1    Dec. 8, 2005

Related U.S. Application Data

(60) Provisional application No. 60/412,375, filed on Sep. 20, 2002.

(30) Foreign Application Priority Data

Sep. 13, 2002   (EP)   .................................. 02020616

(51) Int. Cl.
H04B 7/10   (2006.01)

(52) U.S. Cl. .................... 375/347; 375/130; 370/320
(58) Field of Classification Search ................. 370/335, 370/342; 375/147, 148, 150, 347; 455/133, 455/263, 424, 561; 709/223
See application file for complete search history.

(56) References Cited

U.S. PATENT DOCUMENTS

2002/0087674 A1 *   7/2002   Guilford et al. ............. 709/223

FOREIGN PATENT DOCUMENTS

| EP | 0989685 | 3/2000 |
| EP | 1091501 | 4/2001 |
| EP | 1033823 | 4/2003 |

* cited by examiner

*Primary Examiner*—David C Payne
*Assistant Examiner*—Adolf Dsouza
(74) *Attorney, Agent, or Firm*—Michael Cameron

(57) ABSTRACT

A method for adaptively scheduling activation of a path-searcher for a mobile terminal operative in a telecommunication system. The mobile terminal is capable of receiving multi-path signals originating from a scattered signal from a transmitter of at least one base station in the telecommunication system. The time lag between consecutive path-searcher activations is according to the method determined based on a value of the power delay profile discrepancy between two consecutive power delay profiles. The power delay profiles are derived from at least a subset of the powers of signals received at different delays during the path-searcher activation.

29 Claims, 7 Drawing Sheets

| Delay number | Power | Weight ($w^{(n-1)}$) |
|---|---|---|
| 4 | $\hat{p}_4^{(n-1)}$ | $\hat{N}_p$ |
| 6 | $\hat{p}_6^{(n-1)}$ | $\hat{N}_p - 1$ |
| ⋮ | ⋮ | ⋮ |
| 2 | $\hat{p}_2^{(n-1)}$ | 2 |
| 10 | $\hat{p}_{10}^{(n-1)}$ | 1 |
| All delays not incorporated | | 0 |

Table 1

| Delay number | Power | Weight ($w^{(n)}$) |
|---|---|---|
| 10 | $\hat{p}_{10}^{(n)}$ | $\hat{N}_p$ |
| 4 | $\hat{p}_{14}^{(n)}$ | $\hat{N}_p - 1$ |
| ⋮ | ⋮ | ⋮ |
| 2 | $\hat{p}_2^{(n)}$ | 2 |
| 6 | $\hat{p}_6^{(n)}$ | 1 |
| All delays not incorporated | | 0 |

Table 2

Fig. 6

METHOD FOR PATH-SEARCHER SCHEDULING

This patent application claims the benefit of priority from U.S. Provisional Patent Application Ser No. 60/412,375 filed on Sep. 20, 2002. This application incorporates by reference the entire disclosure of U.S. Provisional Patent Application Ser. No. 60/412,375.

FIELD OF THE INVENTION

The present invention relates to a method for scheduling a path-searcher in a communication system, wherein signals are transmitted from a transmitter to a receiver. More specifically, the communication system comprises at least one base station and one mobile communication terminal, in which system signals comprise waveforms and wherein a received or preprocessed signal is sampled. According to the method of the invention mutual signal delays are utilized for scheduling of a path-searcher of the terminal. The signals originate from one or several transmitters, which signals have propagated along several different paths.

The invention also relates to a mobile communication terminal adapted to adaptively schedule path-searcher activations depending on the discrepancy between power profiles of consecutive path-searcher activations.

DESCRIPTION OF THE PRIOR ART

In a telecommunication system, after a signal has left the transmitter it is scattered into several parts as it propagates. Therefore, several copies of the signal arrive at the receiver at slightly different points of times, as the signal has propagated with the same speed along different paths. The signal scattering varies depending on the environment the signal has to pass from the transmitter to the receiver, such as buildings and mountains etc. Examples of a mobile communication terminal are a mobile telephone, a pager, a communicator, i.e. an electronic organizer, a smartphone or the like.

In WCDMA (Wide band Call Division Multiple Access) and other communication techniques multi-path interference due to signal scattering is a common problem, as indicated above. Multi-path interference is caused by the broadcast signal travelling over different paths to reach the receiver. The receiver then has to recover the signal combined with echoes of varying amplitude and phase. This results in two types of interference;

Inter-chip interference: The reflected signals are delayed long enough that successive chips in the demodulated signals overlap, creating uncertainty in the data.

Selective fading: The reflected signals are delayed long enough that they are randomly out of phase, and add destructively to the signal, causing it to fade.

To combat interference, the multi-path signals may be detected, processed and added to the desired signal for maximizing it. To find and identify multi-path signal delays the mobile terminal comprises a path-searcher. The path-searcher is run to find multi-path signal delays from a transmitter(s) at possible delays from the activation of the path-searcher. This is performed by first multiplying the received signal at a certain delay with the scrambling and channelization codes for a signal at a certain delay to derive pilot symbols of the received signal. Then the pilot symbols are multiplied with their complex conjugate and summed over a given number of symbols, and the result is squared. A given number of squares are then averaged, which is a measure of the received power and noise for the delay. This is repeated for a given number of delays, which constitute the delay window size. The powers of the delays of a delay window form a power delay profile. The delays having the largest powers are then chosen among the powers of the power profile that give the largest power for the desired signal. Once the delays have been located, despreading of the received signal for the chosen delays can be performed, followed by decoding of the sent bit stream.

In the following, by delay is meant the signal received by the receiver at a given time delay from the activation of the path-searcher, and the delay power is meant the power of the signal detected at said time delay. The delay location may constitute of pure noise or a scattered signal from a transmitter. Normally, the power from noise is well below the corresponding power for a delayed transmitted signal. Further, by multi-path signals is meant broadcast signals sent from a transmitter and received at any delay of the path-searcher activation.

The number and location in amplitude and phase of the multi-path signals received by the receiver are a function of the speed of the mobile communication terminal. The faster the mobile communication terminal moves in relation to the base station the more frequently the multi-path signals emerge and vanish, and hence the more frequently the path-searcher has to be activated for following the power profile. The more frequent the path-searcher activations become, the larger the power consumption is going to be. This is a problem as low power consumption is essential for a mobile terminal.

A straightforward solution of the scheduling problem is to schedule the path-searcher activations according to a fixed pattern. However, this requires that the fixed pattern is chosen according to the worst possible case, which could be a considerably waste of power consumption. Therefore, it is preferred to schedule the path-searcher activations adaptively depending on the speed of the mobile terminal. In the known prior art, the speed of the mobile terminal is estimated by estimating the Doppler frequency of the received signals. However, as the signal contains a lot of noise, the estimate of the speed of the terminal is not very robust, which makes it difficult to use said estimate to schedule the path-searcher activations. Also, clock drift between the base station and the mobile terminal will not be found using the known prior art, causing a further degradation of the activations of the path-searcher.

SUMMARY OF THE INVENTION

The object of the invention is to provide a method for decreasing the power consumption of a mobile communication terminal operative in a telecommunication system. More precisely, the object of the invention is to provide a method for decreasing the power consumption of a path-searcher of a receiver of the mobile terminal. Also, it is an object of the invention to provide a method, with which it is possible to follow the movement of a power profile of a path-searcher.

The above objects is according to the invention achieved by a method, which provides the possibility to adaptively scheduling path-searcher activations based on the value of the power delay profile discrepancy between power delay profiles of consecutive path-searcher activations. A power delay profile are determined for each path-searcher activation, which profiles comprise at least the powers of a subset of the powers of the signals received at different delays during each path-searcher activation. By utilizing the existing power profiles, the value of the power delay profile discrepancy of two consecutive power delay profiles is determined, which is an indication of the speed of the mobile terminal relatively to the at least one base station. A large power delay profile discrepancy is an indication of a fast movement of the mobile terminal, and the time lag between consecutive path-searcher activations may be decreased and vice verse.

Another object of the invention is to provide a mobile communication terminal, which has decreased power consumption. Also, it is an object of the invention to provide a mobile communication terminal, which is adapted to follow the power delay profile of a path-searcher without estimating the velocity of the mobile communication terminal relatively to a base station.

A mobile terminal adapted to adaptively schedule activation of a path-searcher of the mobile terminal achieves the above objects. Further, the mobile terminal is adapted to derive power delay profiles of activations of the path-searcher of the receiver of the mobile communication terminal. Each profile is based on at least a subset of the delay powers detected during the path-searcher activation. Finally, the mobile terminal is adapted to determine a value of the power delay profile discrepancy between two consecutive power delay profiles. Said value indicates the need of increasing or decreasing the time lag to the next the next path-searcher activation, which time lag is computed based on a penalty function penalizing large and rewarding low power delay profile discrepancies.

The method and the mobile terminal of the invention has the advantage of decreasing the power consumption relatively to path-searchers known in the art due to the adaptable time lag between path-searcher activations. Also, using the method according to the invention compensation for clock drift between the base station and the mobile terminal is provided. Finally, the inventive method also provides the possibility to robustly and adaptively schedule the path-searcher without actually estimating the velocity of the mobile communication terminal.

Further preferred features of the invention are defined in the dependent claims.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

In the following, preferred and alternative embodiments will be described in more detail with reference to the enclosed drawings, in which:

FIG. 6 is tables illustrating the ranking of the third embodiment; and

DETAILED DESCRIPTION OF EMBODIMENTS

Figure 1A:
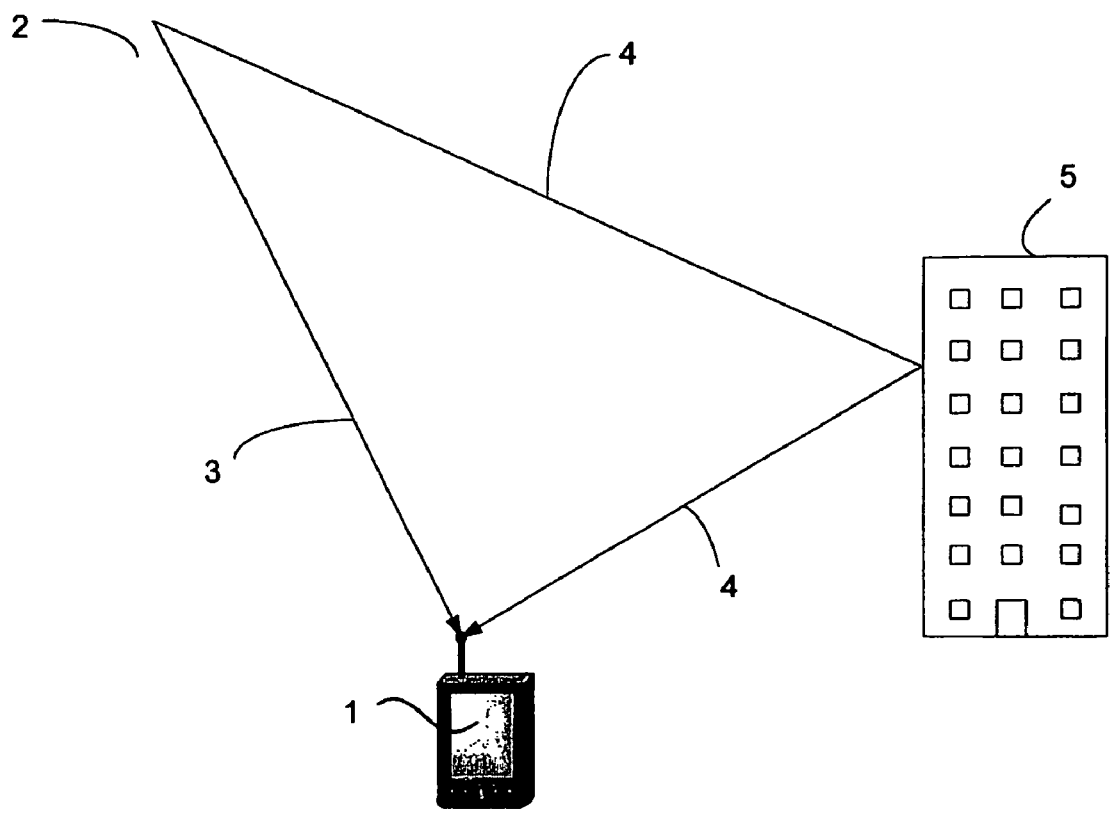
FIG. 1A illustrates a mobile communication terminal adapted according to the invention to receive multi-path signals from a base station and schedule a path-searcher accordingly.
Figure 1B:
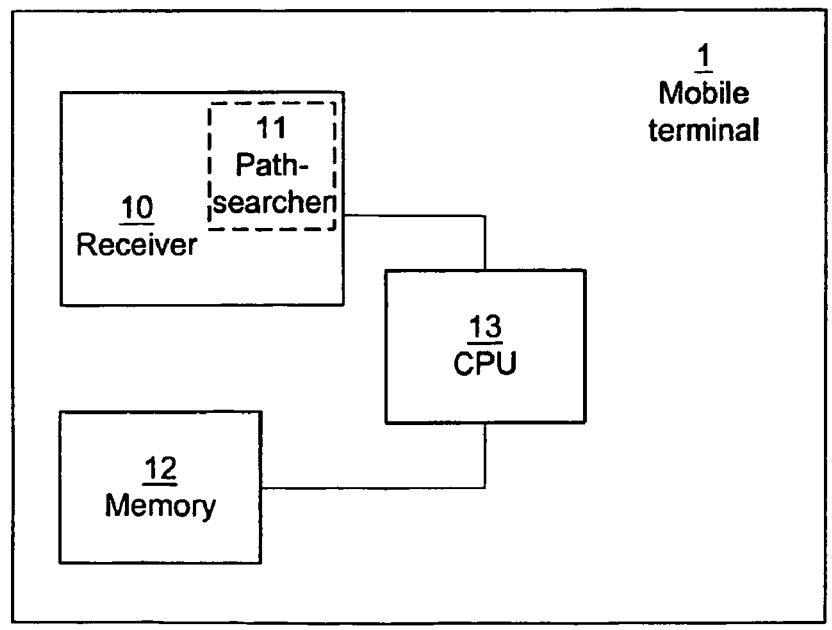
FIG. 1B is a block diagram showing components of the mobile terminal of FIG. 1A.

A mobile terminal 1 will in operation in a telecommunication system, such as a wide band call division multiple access (WCDMA) system, experience multi-path signals. A signal from a transmitter of at least one base station 2 will propagate to the mobile terminal 1 through different paths due to signal scattering. For example, the signal may take a direct path 3 from the base station 2 to the mobile terminal 1, or an indirect path 4, wherein the signal is reflected one or several times on e.g. a building 5 or a mountain. Due to the density of objects reflecting the scattered signal, it will take more or less time for the multi-path signals to arrive at the mobile terminal 1. Consequently, the mobile terminal 1 will receive copies of the original signal from the base station 2 having different delays, i.e. multi-path signals. To derive a signal having sufficient power, a receiver 10 of the mobile terminal 1 comprises a path-searcher 11 to find multi-path signals originating from the same signal. According to the invention there is provided a method for adaptively scheduling activations of the path-searcher 11, which will be explained in the following.

As is readily understood, as the mobile communication terminal 1 is adapted to communicate with e.g. the base station 2, the mobile communication terminal 1 also has an complete RF chain for communicating with said network 21. However, a detailed disclosure of the RF chain is not necessary for the understanding of the invention and will therefore not be further described herein.

If the scheduling of the path-searcher 11 should be executed without the worst case scenario, it is preferred to adapt the time lag between two consecutive activations based on variations of the power of detected signals at different delays of the path-searcher 11 activation. Roughly speaking, the faster the mobile terminal 1 is travelling, the faster the multi-path signals will drift in time and the more likely it may happen that new paths emerge or old paths vanish. However, each path-searcher activation increases the total power consumption of the mobile terminal, and hence it is preferred to run the path-searcher 11 with the longest possible time lags.

The method according to the invention provides the possibility to run the path-searcher 11 with adaptable time lags between two consecutive path-searcher activations. According to the method, the delay powers of two consecutive path-searcher activations, i.e. the power profiles, will be compared. Depending on the discrepancy between consecutive power delay profiles the time lag to the next path-searcher activation is increased or decreased. The duration of the path-searcher activation constitutes a delay window size, during which the power of a signal received by the receiver 10 of the mobile communication terminal 1 is measured at a number of consecutive delays, which constitute the power profile, from the activation of the path-searcher 11. As indicated above, the signal received at each delay may constitute of noise or a multi-path signal. The powers of at least a subset of the delays will be accumulated for each path-searcher activation. If the discrepancy of the powers of two consecutive power delay profiles is large, the time lag between consecutive path-searcher activations will be decreased and vice versa. Consequently, the time lag between two consecutive path-searcher activations is inverse proportional to the power delay profile discrepancy.

For convenience, the power detected at a certain delay during the path-searcher activation will in the following be referred to as the delay power. As the number of possible delays are determined based on the possibility that a multi-path signal might be received by the receiver 10, delay powers may constitute of the power of noise or an actual multi-path signal.

To compute the power of a given delay, the mobile terminal 1 receives a signal, which is first multiplied with the scrambling and channelization codes and then added over the length of the channelization code to derive a pilot symbol. Then, the sum of the derived-pilot symbols multiplied with the conjugate of the pilot symbol is computed over a given number of symbols, and the result is squared. A given number of squares are then averaged, which is a measure of the received power and noise for that delay. This is repeated for each delay during the activation of the path-searcher 11.

The powers of the delays of a path-searcher activation constitutes the power delay profile, which when derived is stored in the memory 12 of the mobile communication terminal 1 to be used according to the method of the invention.

In the following, different embodiments will be described with reference to the accompanying drawings. According to the invention, the number of possible multi-path signals during one delay window is denoted $N_p$ and is given by the path-searcher 11. Both the delay window size and the number of possible delays may be set differently depending on different designs and has to be thoroughly tested and evaluated in each specific case.

The powers of each possible delay are denoted by $p_i$, where $i=1, \ldots, N_p$. A power delay profile p is the sum of the powers of each path in the delay window received during an activation of the path-searcher 11. In the following, the power delay profiles described in the following are normalized for statistical and evaluation purposes, if not otherwise stated, i.e.

$$\sum_{i=1}^{N_P} p_i = 1.$$

The delays are indexed by the variable i. The time delay between two adjacent possible delays indexed by i and i+1 could be e.g. a chip. However, there are other possible time delays, such as a ¼ chip, e.g. depending on the required resolution of the path-searcher 11.

In a first embodiment, the current power delay profile is denoted by $p^{(n)}$, where n>=1, and the previous power delay profile $p^{(n-1)}$, each comprising a number of delay powers $p_i$. Consequently, an estimate of the first power delay profile is denoted by $p^{(0)}$. The minimum and maximum time lag to the next path-searcher activation is denoted by $\tau_{min}$ and $\tau_{max}$, respectively. Examples of values of these variables are $\tau_{min}$=70 ms and $\tau_{max}$=500 ms. However, the specific values of $\tau_{min}$ and $\tau_{max}$ may be set differently and have to be thoroughly tested and evaluated in each individual case. $\tau^{(n)}$ is the size of the time lag to the next path-searcher activation, which is adaptable as set out above.

Figure 2:
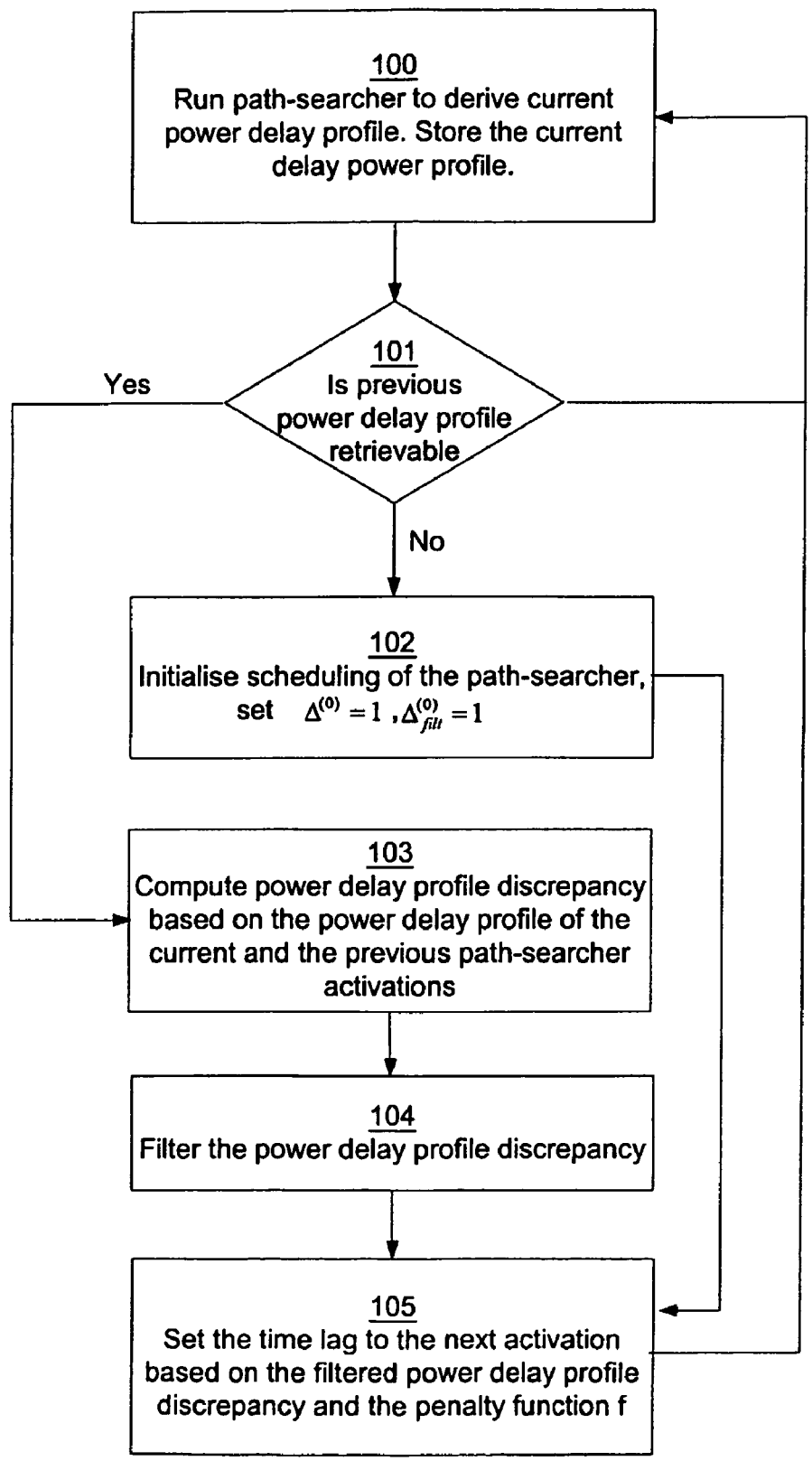
FIG. 2 is a flowchart of the steps of a first embodiment of the method according to the invention.

The first embodiment of the scheduling of activation of the path-searcher 11 will now be explained with reference to FIG. 2. In a first step 100, the current power delay profile is derived by the path-searcher 11 of the receiver 10. The current power delay profile is stored in the memory 12 to be used as the previous delay power profile in a subsequent scheduling of the path-searcher 11.

Then in step 101 it is decided whether a previous delay power profile is retrievable. If not, the scheduling of the path-searcher activation is in step 102 initialized by setting $\Delta^{(0)}$=1, $\Delta_{filt}^{(0)}$=1, and choosing $\lambda \geq 0$. This is e.g. the case when only the first delay power profile $p^{(0)}$ has been derived.

Here, $\Delta^{(n)}$ is an intermediary power delay profile discrepancy variable, $\Delta_{filt}^{(n)}$ is a filtered power delay profile discrepancy variable, and $\lambda$ is a filter parameter. The filter parameter $\lambda$ may be chosen differently depending on the path-searcher implementation, e.g. the noise level accepted and the speed of the filter. The scheduling proceeds from step 102 to step 105, wherein the time lag between two consecutive path-searcher activations, $\tau^{(n)}$, will initially be set to $\tau_{min}$, i.e. the worst case scenario, as will be further explained below. This initialization only has to be made for the first scheduling of the path-searcher 11, e.g. when the mobile terminal 1 is switched on. Therefore, if $\Delta_{filt}^{(0)}$=1 is set in step 102, the time lag is set accordingly, and the scheduling is returned to step 100

If it is decided in step 101 that a previous delay power profile is retrievable, in step 103, the value of the power delay profile discrepancy between the current and the previous power delay profiles $p^{(n)}$ and $p^{(n-1)}$, respectively, are computed based on the current and the previous power delay profiles of two consecutive path-searcher activations and put in the power delay profile discrepancy variable according to the following:

$$\Delta^{(n)} = \frac{1}{2}\sum_{i=1}^{N_p}|p_i^{(n)} - p_i^{(n-1)}|, n \geq 1, 0 \leq \Delta^{(n)} \leq 1$$

Consequently, in the first embodiment the value of the power delay profile discrepancy is based on the actual difference between two consecutive power delay profiles.

Then, in step 104 the value of the power discrepancy variable is filtered to stabilize the noise and get a filtered power delay profile discrepancy variable $\Delta^{(n)}$ by using the following function:

$$\Delta_{filt}^{(n)} = \lambda \Delta_{filt}^{(n-1)} + (1-\lambda)\Delta^{(n)}.$$

As is realized, also the value of the filtered power delay profile discrepancy variable is a real number between zero and one.

Finally, at step 105 the time lag to the next path-searcher activation, $\tau^{(n)}$, is given by:

$$\tau^{(n)} = f(\Delta_{filt}^{(n)})$$

The function $f$ is an arbitrary penalty function such that:

$$f(0) = \tau_{max} \text{ and } f(1) = \tau_{min}.$$

The penalty function $f$ may be set differently depending on user preferences and wanted characteristics of the time lag to the next path-searcher activation. Any penalty function penalizing large power delay profile discrepancy values and rewarding low power delay profile discrepancy values may be utilized. When the time lag has been computed in step 105, the scheduling is returned to step 100, where the path-searcher is activated with the computed time lag $\tau^{(n)}$.

Figure 3:
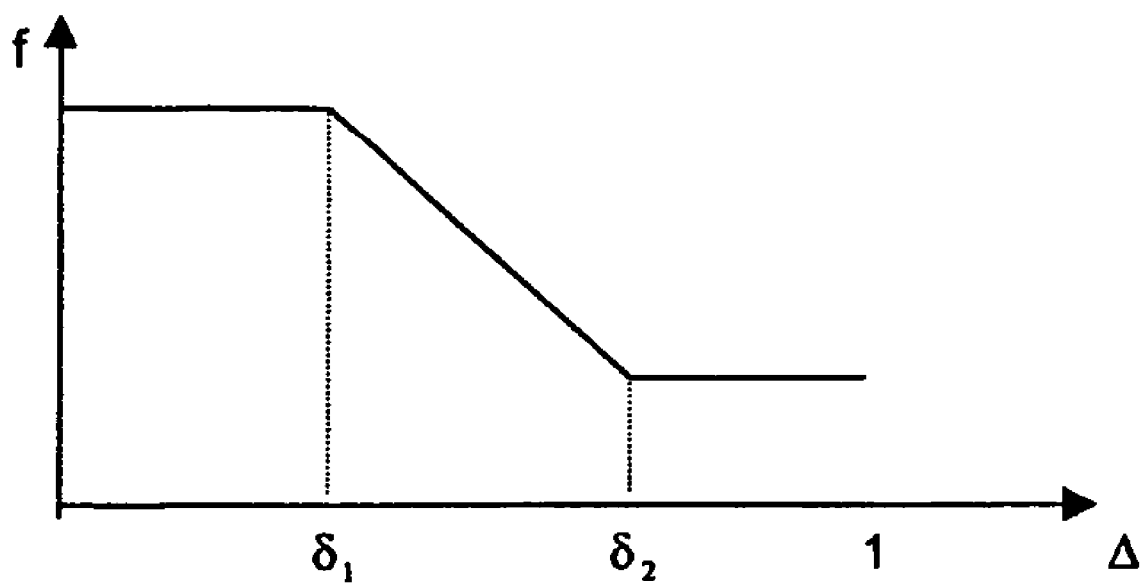
FIG. 3 is an exemplifying penalty function used to derive the time lag to the next path-searcher activation.

An example of the penalty function $f$ is shown in FIG. 3, which is a piece-wise linear function. There will always be some amount of noise, e.g. noise peaks detected as multi-path signals, in the estimates of the filtered power delay discrepancy profile, which means that even though the multi-path signals never move in phase and amplitude, there will never be a $\Delta_{filt}^{(n)}$ equal to zero. Because of this, the time lag to the next path-searcher activation should be set to $\tau_{max}$ if $\Delta_{filt}^{(n)}$ is smaller than a first threshold value $\delta_1$. As is understood, also this variable may be set differently in each individual case depending on the specific path-searcher implementation. Similarly, the interpretation of $\Delta_{filt}^{(n)}$ being larger than a second threshold value $\delta_2$ is that there is a $100\Delta_{filt}^{(n)}\%$ power discrepancy between the two consecutive power delay profiles $p^{(n)}$ and $p^{(n-1)}$, respectively. In the function $f$ of FIG. 3, the time lag between path-searcher activations is set to $\tau_{min}$ when the power discrepancy between two consecutive power delay profiles is larger than $\delta_2$, which may be set differently in each individual case in accordance with $\delta_1$.

A second embodiment will now be described, by which the invention is further improved in that the memory capacity required will be decreased.

In the second embodiment, only a subset of the powers $p_i$ of the derived power delay profile is selected and denoted by $\hat{p}_j$, $j=1, \ldots, \hat{N}_p$ for deriving a reduced power delay profile. In this embodiment, the delay powers are indexed by j and correspond to a particular index i in the first embodiment. The powers of the multi-path signals may e.g. be chosen as the $\hat{N}_p$ paths with the largest powers. Consequently, only the selected powers have to be stored in the memory 12 for the following processing for the scheduling of the path-searcher 11. As in the first embodiment, the selected powers are normalized for processing purposes, i.e.:

$$\sum_{j=1}^{\hat{N}_p} \hat{p}_j = 1.$$

Figure 4:
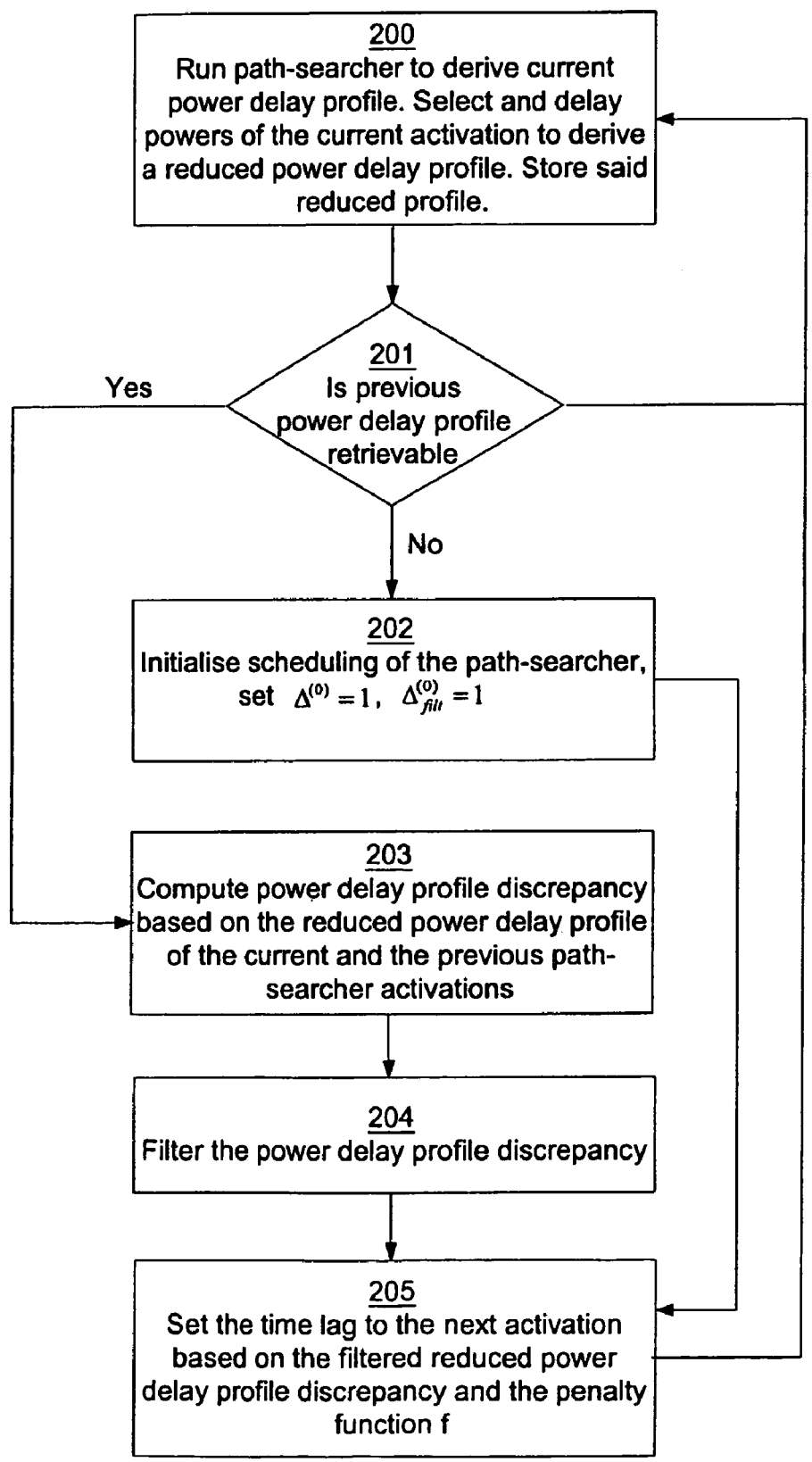
FIG. 4 is a flowchart of the steps of a second embodiment of the method according to the invention.

The steps of the method according to the second embodiment will now be described with reference to FIG. 4. Some of the variables of the second embodiment correspond to the like variables of the first embodiment, e.g. $\tau_{min}$ and $\tau_{max}$, and should have the same meaning. Therefore, they will not be described again in relation to the second embodiment.

In a first step 200, the path-searcher 11 of the receiver 10 is run to derive the current power delay profile. Further, to form a reduced power delay profile the delay powers are selected as set out above and stored in the memory 12 to be used as the reduced previous delay power profile in a subsequent scheduling of the path-searcher 11.

Then in step 201 it is decided whether a reduced previous power delay profile is retrievable. If not, the scheduling of the path-searcher activation is in step 202 initialized by setting $\Delta^{(0)}=1$, $\Delta_{filt}^{(0)}=1$, and chose $\lambda \geq 0$, in correspondence with the first embodiment. Then the scheduling proceeds from step 202 to step 205, wherein the time lag $\tau^{(n)}$ to the next path-searcher activation will be set to $\tau_{min}$.

If is decided in step 201 that a reduced previous power delay profile is retrievable, in step 203 the value of the power delay discrepancy between the current and the previous reduced power delay profiles $\hat{p}^{(n)}$ and $\hat{p}^{(n-1)}$, respectively, is computed using the reduced set of power delay profiles. In this embodiment, the delays corresponding to $\hat{p}_j^{(n)}$ that are at the most q chips away from an old delay $\hat{p}_j^{(n-1)}$ of the previous reduced power delay profile are extracted. q is dependent of the resolution of path-searcher implementation, i.e. the time delays between two adjacent delays as discussed above. The extracted remaining delays are enumerated as $\hat{p}_{j_k}^{(n)}$, $k=1, \ldots, \hat{N}'_p$, where $\hat{N}'_p \leq \hat{N}_p$.

The value of the power delay profile discrepancy between the current and the previous reduced power delay profile is computed as:

$$\Delta^{(n)} = \sum_{j=1}^{\hat{N}_p} \hat{p}_{j_k}^{(n)}.$$

Thus, in the second embodiment, the value of the power delay profile discrepancy $\Delta^{(n)}$ may be looked upon as the sum of the powers of new delays which has a considerably power contribution (not noise), i.e. the multi-path signals present in the current reduced power delay profile but not in the previous.

In step 204, the power delay profile discrepancy is filtered in the same way as in the first embodiment, that is:

$$\Delta_{filt}^{(n)} = \lambda \Delta_{filt}^{(n-1)} + (1-\lambda)\Delta^{(n)}.$$

Once again, the filtered power delay profile discrepancy variable $\Delta_{filt}^{(n)}$ is a real number between zero and one.

Finally, in step 205 the time lag $\tau^{(n)}$ to the next path-searcher activation is computed using the penalty function $f$, i.e.:

$$\tau^{(n)} = f(\Delta_{filt}^{(n)}).$$

Also in this embodiment, $f$ is an arbitrary penalty function, such that:

$$f(0) = \tau_{max} \text{ and } f(1) = \tau_{min}.$$

The function $f$ may be chosen differently in each individual case depending on the path-searcher implementation, e.g. according to the example shown in FIG. 3. When the time lag has been computed in step 205, the scheduling is returned to step 200, where the path-searcher is activated with the computed time lag $\tau^{(n)}$.

As in the first embodiment, the filtering in step 204 is performed to remove some of the noise inherent in the estimate. Alternatively, the power delay profile p or the reduced power delay profile $\hat{p}$ may be filtered in step 200 or 203 to remove some of the noise inherent in the estimate. As is obvious, the same may be applied also in the first embodiment.

A third embodiment of the method according to the invention will now de described with reference to FIGS. 5 and 6. In the third embodiment, a reduced set of power delay profiles $\hat{p}^{(n)}$ and $\hat{p}^{(n-1)}$ will be utilized, as in the second embodiment. However, as should be noted it is equally possible to utilize complete power delay profiles as in the first embodiment. In a first step 300 of FIG. 5, the path-searcher 11 of the receiver 10 is run to derive the current power delay profile. Also, the delay powers received during the current path-searcher activation are first selected, e.g. as the $\hat{N}_p$ paths with the largest powers. However, other selections are also possible. Also, each selected power $\hat{p}_j^{(n)}$ is ranked and given a ranking weight $w_j''$ where $j=1 \ldots \hat{N}_p$, from 1 to $\hat{N}_p$. Other ranking weights are equally possible within the scope of the invention. The ranking of said selected powers are illustrated in FIG. 6, wherein table 1 comprises a ranked previous power delay profile and table 2 a ranked current power delay profile, respectively. Also, said tables comprise the delay number of each delay for identification of a specific delay. Each ranked profile is stored in a memory of the mobile terminal 1 to be processed by e.g. a CPU of said terminal 1. All delays not comprised in each ranked power delay profile are given the weight zero. Consequently; all delays not having a power over a certain threshold, e.g. the noise floor, do not has to be stored, which saves memory capacity. The ranked current delay power profile is stored in the memory 12 to be used as the ranked previous delay power profile in a subsequent scheduling of the path-searcher 11.

Then in step 301 it is decided whether a reduced previous delay power profile is retrievable.

Figure 5:
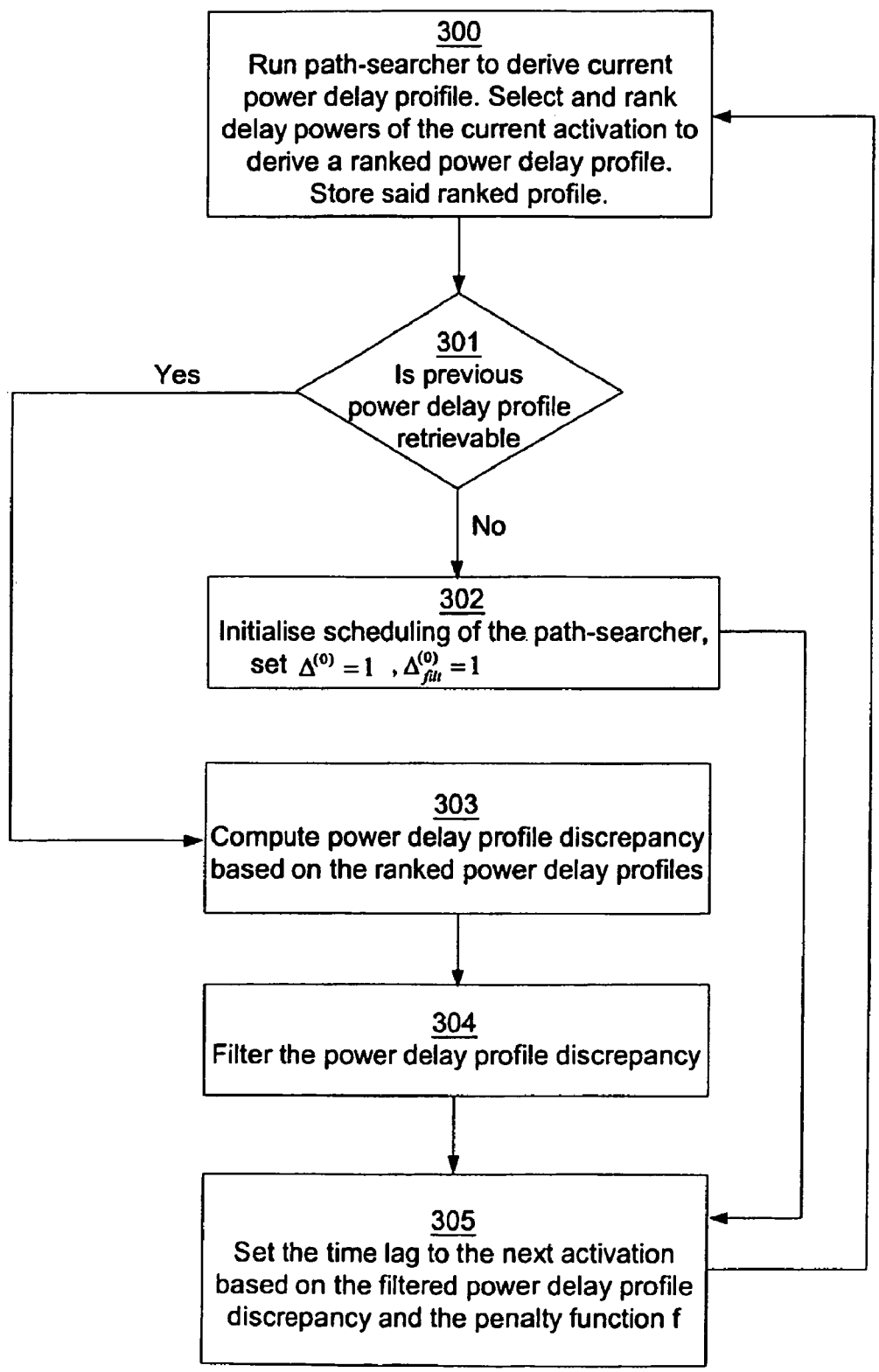
FIG. 5 is a flowchart of the steps of a third embodiment of the method according to the invention.

If the answer in step 301 is no, then in step 302 of FIG. 5 the path-searcher scheduling is initialized by setting $\Delta^{(0)}=1$, $\Delta_{filt}^{(0)}=1$, and chose $\lambda \geq 0$, corresponding to the first and second embodiments. Then the scheduling proceeds to step 305, wherein the time lag $\tau^{(n)}$ to the next path-searcher activation will be set to $\tau_{min}$.

If the it decided in step 301 that a ranked previous delay power profile is retrievable, the scheduling proceeds to step 303 for deriving the value of the power delay profile discrepancy between the ranked current and previous power delay profiles. The value of the power delay profile discrepancy is given by:

$$\Delta^{(n)} = \beta^{-1} \sum_{j=1}^{\hat{N}_p} |w_j^n - w_{Per(j)}^{n-1}|, \beta = \hat{N}_p + \ldots + 2 + 1 = \frac{\hat{N}_p(\hat{N}_p+1)}{2}.$$

The delay j of the current ranked power delay profile corresponds to the delay having index Per(j) of the previous ranked power delay profile, i.e. delays of the current and the previous ranked power delay profiles having the same time delay. Consequently, the corresponding powers present in the current and previous ranked power delay profiles are identified and compared to identify whether the power of a previous delay has changed or not, i.e. if the mobile station has moved. In FIG. 5 this is e.g. seen by delay number 4, which has the highest ranking in table 1, but has the second ranking in table 2. Consequently, the mobile terminal 1 has been moved during the time lag between the previous and the current path-searcher activations in this example. Therefore, the contribution of delay number 4 is added to the power delay profile discrepancy variable. As should be noted, ranked current and previous power delay profiles may equally well be compared according to other schemes than above, e.g. to powers having the same delay plus/minus some additional time delay.

At step 304, the value of the power delay profile discrepancy is filtered according to the same principles as set out above to derive value of the filtered power delay profile discrepancy variable:

$$\Delta_{filt}^{(n)} = \lambda \Delta_{filt}^{(n-1)} + (1-\lambda)\Delta^{(n)}.$$

Finally, in a last step 305 the time lag $\tau^{(n)}$ to the next path-searcher activation is computed as:

$$\tau^{(n)} = f(\Delta_{filt}^{(n)}).$$

Also in this embodiment f is an arbitrary penalty function, such that:

$$f(0) = \tau_{max} \text{ and } f(1) = \tau_{min}.$$

The penalty function is, as in the previous embodiments, an arbitrary function chosen depending on the specific path-searcher implementation. The function shown in FIG. 3 and explained above is one example of the function $f$ also for the third embodiment. When the time lag $\tau^{(n)}$ is computed in step 305, the scheduling is returned to step 300, where the path-searcher is activated with the computed time lag $\tau^{(n)}$.

Figure 7:
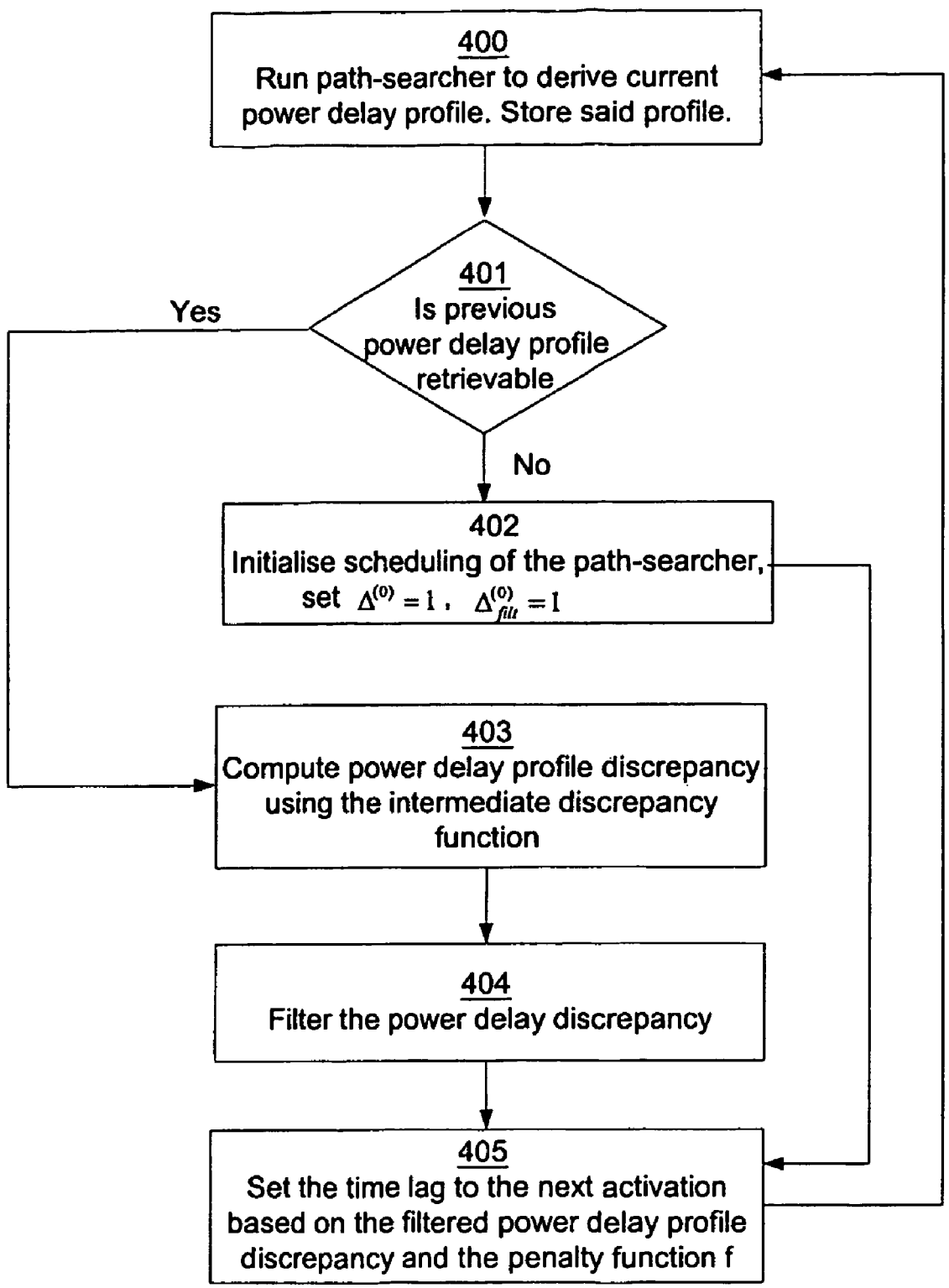
FIG. 7 is a flowchart of the steps of a fourth embodiment of the method according to the invention.

A fourth embodiment of the method according to the method of the invention will now be described with reference to FIG. 7. In the fourth embodiment; complete or reduced power delay profiles may be utilized. For convenience, this embodiment will be explained with reference to complete current and previous power delay profiles $p^{(n)}$ and $p^{(n-1)}$, respectively, as in the first embodiment. In a first step 401 the path-searcher 11 of the receiver 10 is run to derive the current power delay profile, which is stored in the memory 12 to be used as the previous delay power profile in a subsequent scheduling of the path-searcher 11.

Then in step 401, it is decided whether a reduced previous delay power profile is retrievable. If not, the scheduling of the path-searcher activation is in step 402 initialized by setting $\Delta^{(0)}=1$, $\Delta_{filt}^{(0)}=1$, and chose $\lambda \geq 0$, in correspondence with the above embodiments. Then, the scheduling proceeds to step 405, wherein the time lag $\tau^{(n)}$ to the next path-searcher activation will be set to $\tau_{min}$.

As before, the current and previous power delay profiles used in the following are normalized, i.a.:

$$\sum_{i=1}^{N_p} p_i^n = 1, \quad \sum_{i=1}^{N_p} p_i^{n-1} = 1.$$

If it is decided in step 401 that a previous power delay profile is retrievable, in step 403 an intermediate discrepancy function is utilized to compute the power delay profile discrepancy. The intermediate discrepancy function is used to determine whether the power of a specific delay has changed substantially from the previous to the current power delay profile. The discrepancy function is as follows:

$$f(p_i^n, p_i^{n-1}) = \begin{cases} \frac{1}{2}(p_i^n + p_i^{n-1}) & \text{IF } (\min(p_i^n, p_i^{n-1}) < \alpha \text{ AND } \max(p_i^n, p_i^{n-1}) > \beta) \\ 0 & \text{else} \end{cases}$$

The intermediate discrepancy function will only take into account any delay, wherein the power of a certain delay has substantially changed, i.a. increased or decreased from the previous to the current power delay profile. Therefore, the discrepancy function is given a value proportional to the delay power if a certain delay power of any of the current or the corresponding previous power delay profile is less than a first power level $\alpha$ and any of the current or the corresponding previous power delay profile is larger then a second power level $\beta$. Said power levels $\alpha$, $\beta$ have to be thoroughly tested an evaluated in each individual implementation. A suitable level for the first power level $\alpha$ may e.g. be the noise level and a suitable level for the second power level $\beta$ may e.g. be twice the noise level ($2\alpha$). This is an indication that a multi-path signal either has emerged or vanished. Consequently, only births and deaths of multi-path signals are taken into account, which makes this embodiment more robust. Further, the power delay profile discrepancy is computed by adding each value of the intermediate discrepancy function to the power delay profile discrepancy variable, according to the same principles as described above, i.a.:

$$\Delta^{(n)} = \sum_{i=1}^{N_p} f(p_i^n + p_i^{n-1}),$$

wherein $N_p$ is the number of possible delays in each delay window.

In step 404, the power delay profile discrepancy variable is filtered to stabilize noise according to the same principles as set out above, i.a.:

$$\Delta_{filt}^{(n)} = \lambda \Delta_{filt}^{(n-1)} + (1-\lambda)\Delta^{(n)}.$$

Finally, in step 405 the time lag $\tau^{(n)}$ to the next path-searcher activation is set using the filtered power delay profile discrepancy variable and the penalty function penalizing large discrepancy values and rewarding low discrepancy values, according to above:

$$\tau^{(n)} = f(\Delta_{filt}^{(n)}).$$

When the time lag is computed in step 405, the scheduling is returned to step 400, where the path-searcher is activated with the computed time lag $\tau^{(n)}$.

In an alternative embodiment, the mobile terminal 1 may receive signals from several transmitters. This will require several path-searcher activation time lags for each transmitter. However, different time lags are not necessary, and a reduction of complexity is to schedule each path-searcher with the smallest time lag $\tau^{(n)}$ between two consecutive activations. A consequence of this is, however, an increase of power consumption as the scheduling is not optimal.

In all the above embodiments, each value of the power delay profiles has to be stored in a memory 12 of the mobile terminal 1 to be processed by e.g. a CPU (13) of the mobile terminal 1 according to the steps of the method. Also, the processor is adapted to provide a filtering means for performing the processing according to step 104. The path-searcher 11 is described as being a part of the receiver 10. However, as is understood, the path-searcher 11 may equally be provided as a separate component.

The present invention has been described above in reference to a number of embodiments. These are only for illustration purposes and should not be considered as limiting the scope of the invention, which is best defined by the enclosed independent claims.

What is claimed is:

1. A method for scheduling activation of a path-searcher for a mobile communication terminal capable of receiving multi-path signals originating from scattered signals transmitted from at least one transmitter of a telecommunication system, comprising the steps of:
   deriving a first and a second power delay profile, each profile comprising delay powers of a signal at different delays from the activation of the path-searcher; computing a value of the power delay profile discrepancy between said first and second power delay profiles; and computing a time lag to the next path-searcher activation, which is inverse proportional to said value of the power delay profile discrepancy, wherein the scheduling of the path-searcher activation is initialized by setting the time lag to the next path-searcher activation to the minimum time lag, $\tau_{min}$, if no previous power delay profile is retrievable, and wherein the path-searcher is activated to derive the powers of signals received at a number of delays during the path-searcher activation, which powers forms the power delay profile, and wherein the discrepancy between at least a subset of the delays of the second power delay profile and the corresponding delays of the first power delay profile is computed to derive the value of the power delay profile discrepancy;
   wherein the above steps are performed by a processor in the receiver of a mobile terminal.

2. The method according to claim 1, wherein the power delay profile discrepancy is filtered to reduce the noise of the power delay profile discrepancy, which filtering forms a filtered value of the power delay profile discrepancy.

3. The method according to claim 2, wherein the time lag to the next path-searcher activation is given by a penalty function of the filtered value of the power delay profile discrepancy, penalizing large power delay profile discrepancies and rewarding low power delay profile discrepancies.

4. The method according to claim 3, wherein the penalty function is a piece-wise linear function, which sets the time lag to the next path-searcher activation to the maximum time lag, $\tau_{max}$, if the filtered power delay profile discrepancy is smaller than a first threshold value ($\delta_1$) and which sets the time lag to the next path-searcher activation to the minimum time lag, $\tau_{min}$, Then, if the filtered power delay profile discrepancy is larger than a second threshold value ($\delta_2$).

5. The method according to claim 4, wherein the maximum time lag is about 500 ms, and the minimum time lag is about 70 ms.

6. The method according to claim 5, wherein different time lags are provided for activating several path-searchers if the receiver of the mobile communication terminal receives multi-path signals from several transmitters.

7. A method for scheduling activation of a path-searcher for a mobile communication terminal capable of receiving multi-path signals originating from scattered signals transmitted from at least one transmitter of a telecommunication system, comprising the steps of:
   deriving a first and a second power delay profile, each profile comprising delay powers of a signal at different delays from the activation of the path-searcher; computing a value of the power delay profile discrepancy between said first and second power delay profiles; and computing a time lag to the next path-searcher activation, which is inverse proportional to said value of the power delay profile discrepancy, wherein the scheduling of the path-searcher activation is initialized by setting the time lag to the next path-searcher activation to the minimum time lag, $\tau_{min}$, if no previous power delay profile is retrievable, and wherein the path-searcher is activated to derive the powers of signals received at a number of delays during the path-searcher activation; a subset of said powers are selected to form a current reduced power delay profile, wherein all powers present in the current but not in a previous reduced power delay profile is summarized to derived the value of the power delay profile discrepancy;
   wherein the above steps are performed by a processor in the receiver of a mobile terminal.

8. The method according to claim 7, wherein the power delay profile discrepancy is filtered to reduce the noise of the power delay profile discrepancy, which filtering forms a filtered value of the power delay profile discrepancy.

9. The method according to claim 8, wherein the time lag to the next path-searcher activation is given by a penalty function of the filtered value of the power delay profile discrepancy, penalizing large power delay profile discrepancies and rewarding low power delay profile discrepancies.

10. The method according to claim 9, wherein the penalty function is a piece-wise linear function, which sets the time lag to the next path-searcher activation to the maximum time lag, $\tau_{max}$, if the filtered power delay profile discrepancy is smaller than a first threshold value ($\delta_1$) and which sets the time lag to the next path-searcher activation to the minimum time lag, $\tau_{min}$, Then, if the filtered power delay profile discrepancy is larger than a second threshold value ($\delta_2$).

11. The method according to claim 10, wherein the maximum time lag is about 500 ms, and the minimum time lag is about 70 ms.

12. A method for scheduling activation of a path-searcher for a mobile communication terminal capable of receiving multi-path signals originating from scattered signals transmitted from at least one transmitter of a telecommunication system, comprising the steps of:

deriving a first and a second power delay profile, each profile comprising delay powers of a signal at different delays from the activation of the path-searcher; computing a value of the power delay profile discrepancy between said first and second power delay profiles; and computing a time lag to the next path-searcher activation, which is inverse proportional to said value of the power delay profile discrepancy, wherein the scheduling of the path-searcher activation is initialized by setting the time lag to the next path-searcher activation to the minimum time lag, $\tau_{min}$, if no previous power delay profile is retrievable, and wherein the path-searcher is activated to derive the powers of signals received at a number of delays during the path-searcher activation; a subset of said powers are selected to form a current reduced power delay profile comprising powers of different delays, which subset of powers is ranked and assigned a weight to form a ranked current reduced power delay profile; the discrepancy between the weights of the delays of the ranked current reduced power delay profile and the weights of the corresponding delays of a ranked previous reduced power delay profile is computed to derive the value of the power delay profile discrepancy;

wherein the above steps are performed by a processor in the receiver of a mobile terminal.

13. The method according to claim 12, wherein the power delay profile discrepancy is filtered to reduce the noise of the power delay profile discrepancy, which filtering forms a filtered value of the power delay profile discrepancy.

14. The method according to claim 13, wherein the time lag to the next path-searcher activation is given by a penalty function of the filtered value of the power delay profile discrepancy, penalizing large power delay profile discrepancies and rewarding low power delay profile discrepancies.

15. The method according to claim 14, wherein the penalty function is a piece-wise linear function, which sets the time lag to the next path-searcher activation to the maximum time lag, $\tau_{max}$, if the filtered power delay profile discrepancy is smaller than a first threshold value ($\delta_1$) and which sets the time lag to the next path-searcher activation to the minimum time lag, $\tau_{min}$, Then, if the filtered power delay profile discrepancy is larger than a second threshold value ($\delta_2$).

16. The method according to claim 15, wherein the maximum time lag is about 500 ms, and the minimum time lag is about 70 ms.

17. A method for scheduling activation of a path-searcher for a mobile communication terminal capable of receiving multi-path signals originating from scattered signals transmitted from at least one transmitter of a telecommunication system, comprising the steps of:

deriving a first and a second power delay profile, each profile comprising delay powers of a signal at different delays from the activation of the path-searcher; computing a value of the power delay profile discrepancy between said first and second power delay profiles; and computing a time lag to the next path-searcher activation, which is inverse proportional to said value of the power delay profile discrepancy, wherein the scheduling of the path-searcher activation is initialized by setting the time lag to the next path-searcher activation to the minimum time lag, $\tau_{min}$, if no previous power delay profile is retrievable, and, wherein the path-searcher is activated to derive the powers of signals received at a number of delays during the path-searcher activation; at least a subset of the powers are selected to form a current power delay profile comprising powers of different delays; a value of the power of each delay of the current power delay profile and the corresponding previous power delay profile are added to the power delay profile discrepancy if at least one of said powers is below a first power level ($\alpha$) and at least one of said powers is above a second power level ($\beta$), otherwise said powers are discarded, wherein the value of power profile discrepancy is derived;

wherein the above steps are performed by a processor in the receiver of a mobile terminal.

18. The method according to claim 17, wherein the first power level ($\alpha$) corresponds to the noise floor and the second power level ($\beta$) corresponds to twice the noise floor.

19. The method according to claim 18, wherein different time lags are provided for activating several path-searchers if the receiver of the mobile communication terminal receives multi-path signals from several transmitters.

20. A mobile terminal, comprising:

a receiver for receiving signals;

a processor and a path-searcher for finding multi-path signal delays, wherein the mobile terminal is adapted to derive a first and a second power delay profile comprising powers of a signal at different delays, compute a value of the power delay profile discrepancy between said first and second power delay profiles, and compute a time lag to the next path-searcher activation, which is inverse proportional to said value of the power delay profile discrepancy, wherein the processor of the mobile terminal is adapted to compute the value of the power delay profile discrepancy between two consecutive power delay profiles, and compute the time lag to the next path-searcher activation based on said discrepancy and a penalty function penalizing large discrepancy values and rewarding low discrepancy values.

21. The mobile terminal according to claim 20, wherein the mobile terminal is further adapted to receive signals at different delays during a path-searcher activation, and wherein the path-searcher is adapted to compute the powers of at least a subset of said delays to provide a power delay profile.

22. The mobile terminal according to claim 20, wherein the mobile terminal comprises a memory for temporarily storing at least one power delay profile.

23. The mobile terminal according to claim 20, wherein the mobile terminal further comprises a filtering means for filtering said power delay profile discrepancy.

24. The mobile terminal according to claim 20, wherein the path-searcher is comprised in the receiver of the mobile terminal.

25. The mobile terminal according to claim 20, wherein the path-searcher is provided as a separate component of the mobile terminal.

26. The mobile terminal according to claim 20, wherein the mobile terminal is a mobile telephone.

27. The mobile terminal according to claim 20, wherein the mobile terminal is a pager, an electronic organizer, or a smartphone.

28. The mobile terminal according to claim 20, wherein the mobile terminal is further adapted to select a number of delays, $N_p$, of the power delay profile having the highest powers.

29. The mobile terminal according to claim 28, wherein the mobile terminal is further adapted to assign a weight to each delay power of the power delay profile.

* * * * *

UNITED STATES PATENT AND TRADEMARK OFFICE
CERTIFICATE OF CORRECTION

PATENT NO. : 7,555,077 B2
APPLICATION NO. : 10/527366
DATED : June 30, 2009
INVENTOR(S) : Jonsson It is certified that error appears in the above-identified patent and that said Letters Patent is hereby corrected as shown below:

In Column 4, Line 1, delete "DESCRIPTION" and insert -- DISCLOSURE --, therefor.

In Column 6, Line 34, delete "$\Delta^{(n)}$" and insert -- $\Delta_{filt}^{(n)}$ --, therefor.

In Column 7, Line 52, delete "if" and insert -- if it --, therefor.

In Column 8, Lines 3-5, delete " $\Delta^{(n)} = \sum_{j=1}^{N_p} \hat{p}_{j_k}^{(n)}$ " and insert -- $\Delta^{(n)} = \sum_{j=1}^{N_p} \hat{p}_{j_k}^{(n)}$, --, therefor.

In Column 8, Lines 61-62, delete "Consequently;" and insert -- Consequently, --, therefor.

In Column 9, Line 5, delete "$\Delta_{filt}^{(0)}=1$,and" and insert -- $\Delta_{filt}^{(0)}=1$, and --, therefor.

In Column 12, Line 16, in Claim 4, after "$\tau_{min}$," delete "Then,".

In Column 12, Line 66, in Claim 10, after "$\tau_{min}$," delete "Then,".

In Column 13, Line 50, in Claim 15, after "$\tau_{min}$," delete "Then,".

UNITED STATES PATENT AND TRADEMARK OFFICE
CERTIFICATE OF CORRECTION

PATENT NO. : 7,555,077 B2
APPLICATION NO. : 10/527366
DATED : June 30, 2009
INVENTOR(S) : Jonsson It is certified that error appears in the above-identified patent and that said Letters Patent is hereby corrected as shown below:

In Column 14, Line 16, in Claim 17, delete "of" and insert -- of the delay --, therefor.

In Column 15, Line 6, in Claim 28, delete " $N_{p}$, " and insert -- $\tilde{N}_{p}$, --, therefor.

Signed and Sealed this

Tenth Day of November, 2009

David J. Kappos
*Director of the United States Patent and Trademark Office*